3,178,354
STEAM COOLED NUCLEAR REACTOR SYSTEM
WITH IMPROVED FUEL ELEMENT ASSEMBLY
Harold E. Vann and John H. Crowley, Framingham,
Mass., assignors to Jackson & Moreland, Inc., Boston,
Mass., a corporation of Massachusetts
Filed July 25, 1961, Ser. No. 126,611
7 Claims. (Cl. 176—19)

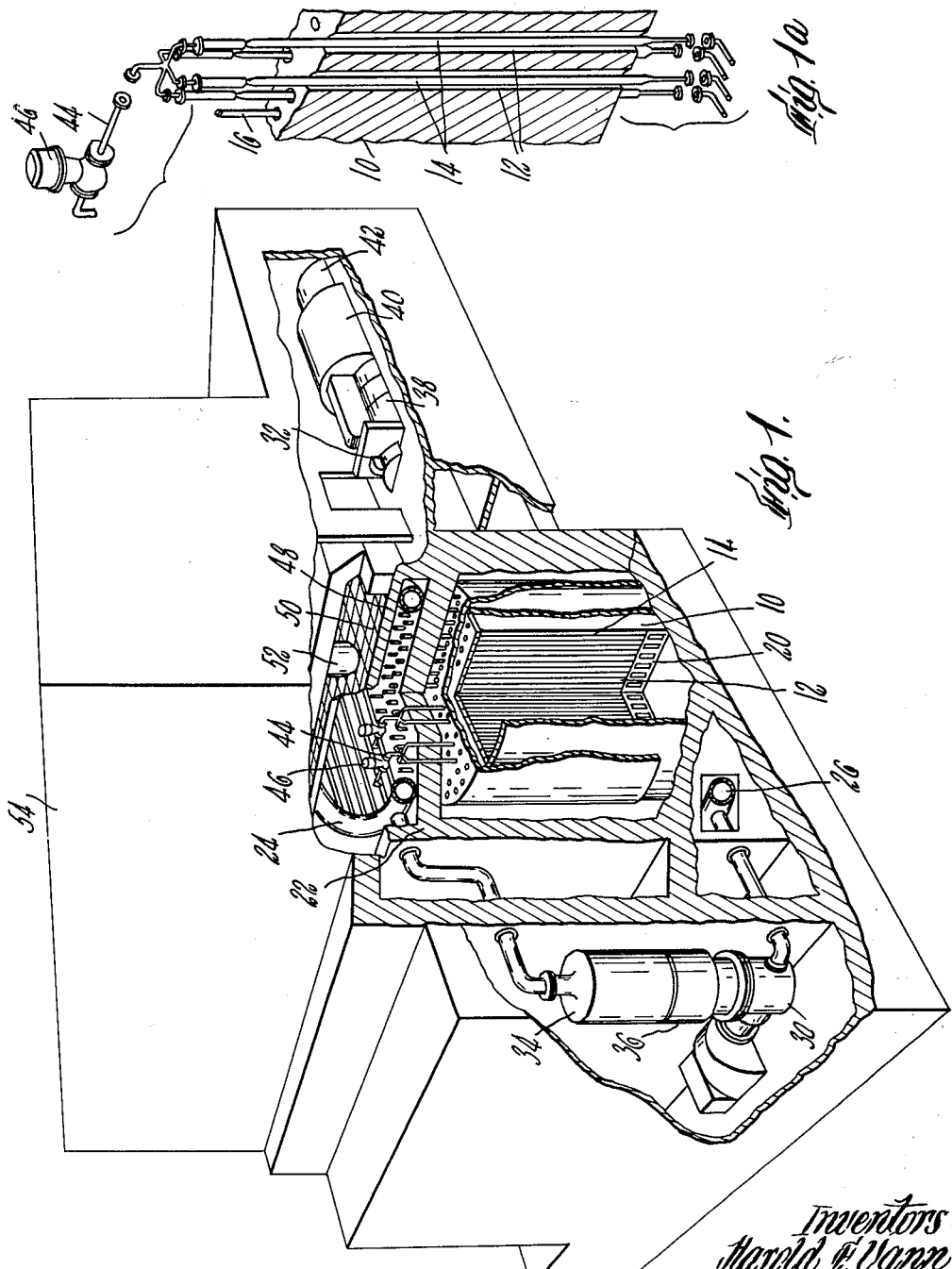

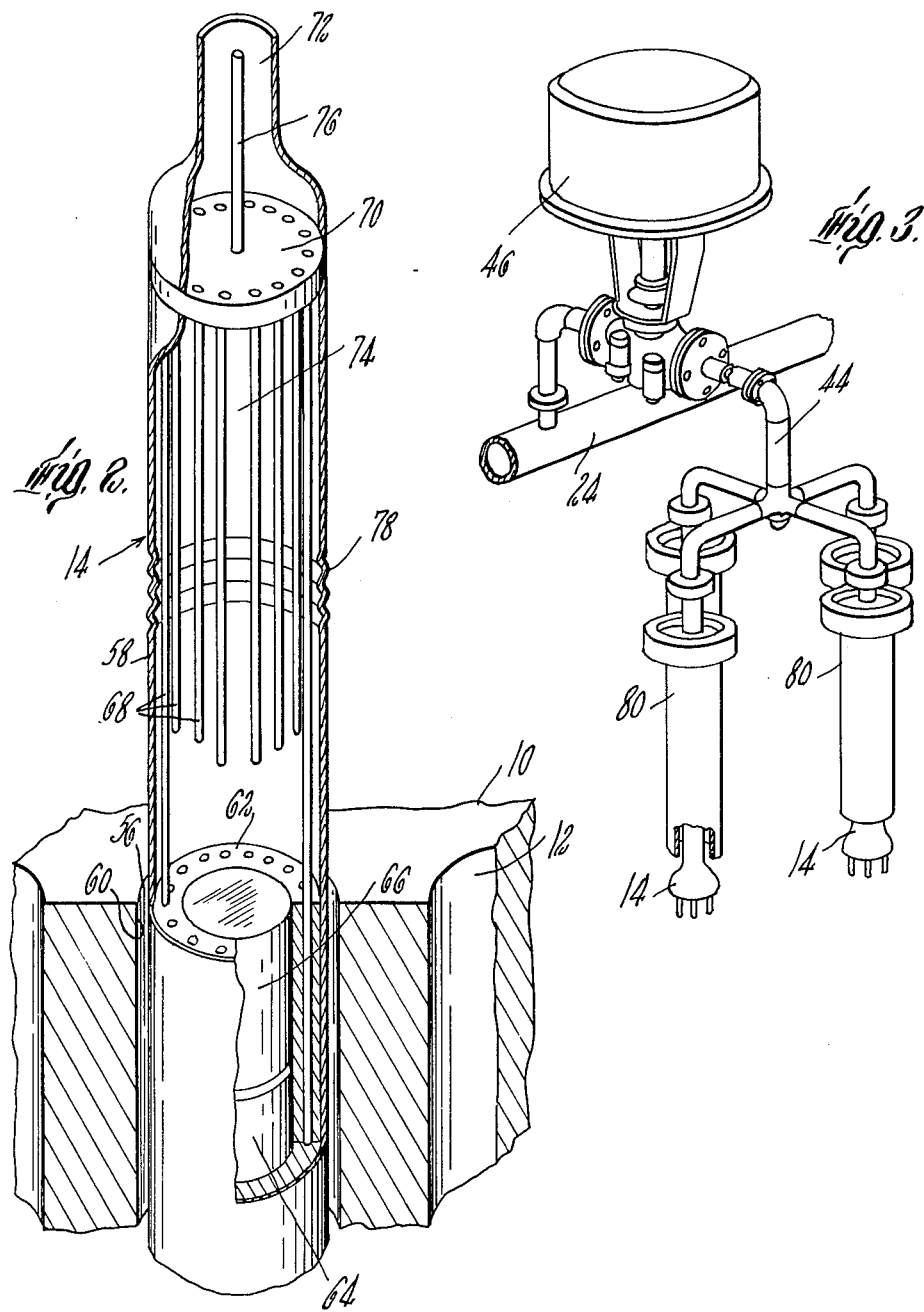

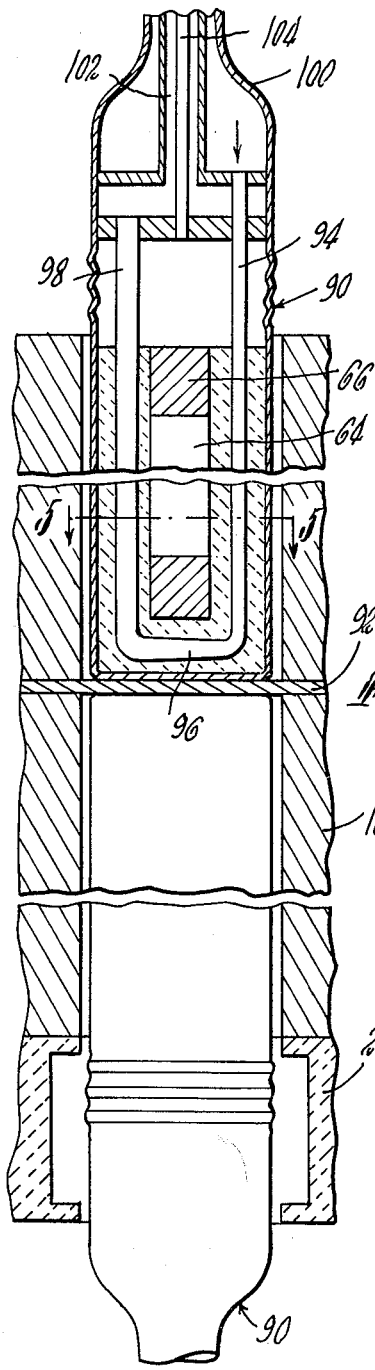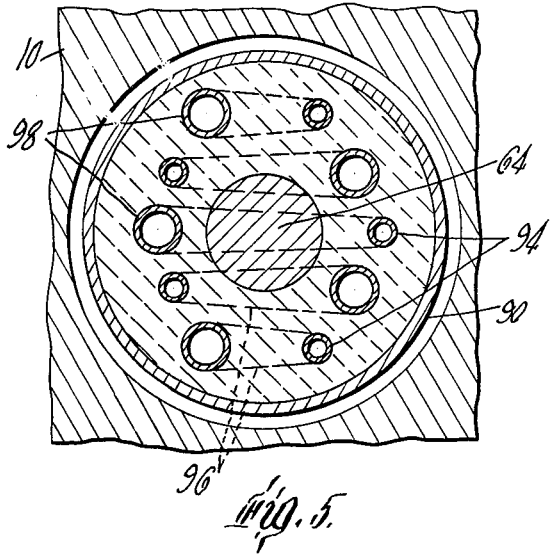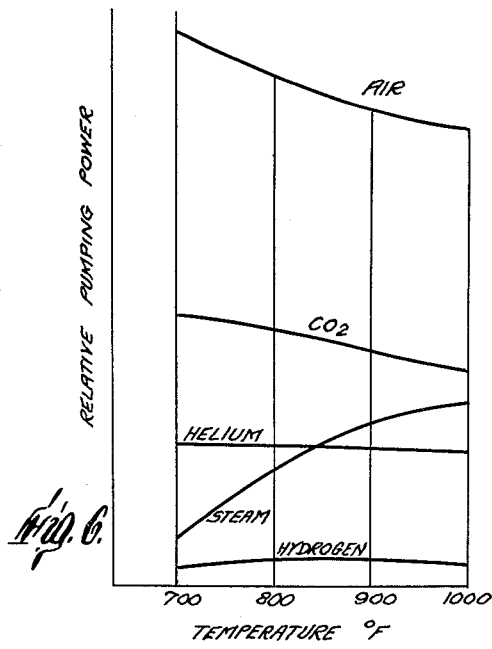

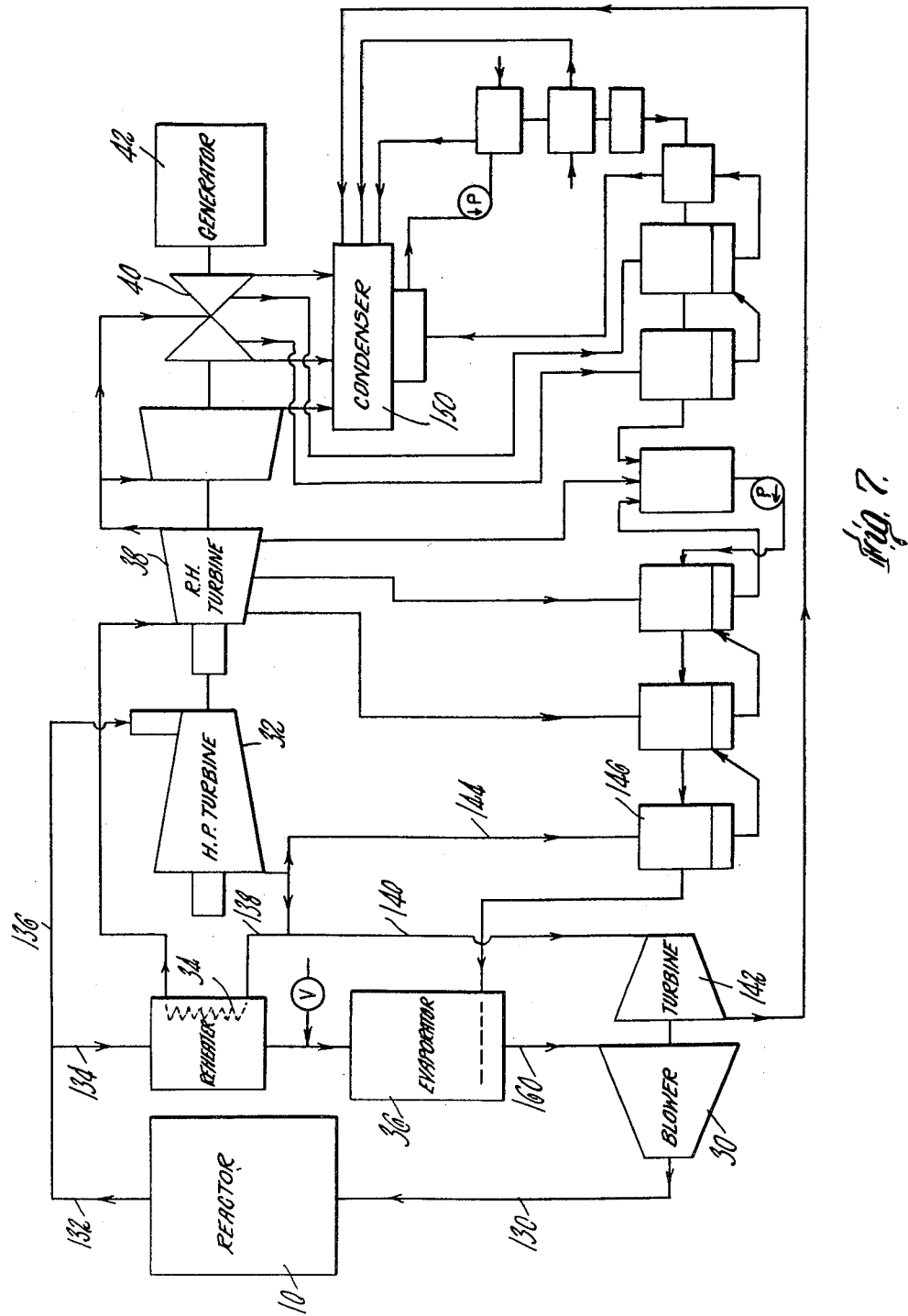

This invention relates to nuclear reactor arrangements and more particularly to an improved gas-cooled nuclear reactor particularly suited for the generation of electrical energy and to improved electrical energy generating systems incorporating such reactors.

As low temperature turbine plants are high in cost and low in efficiency extensive consideration has been given to the development of nuclear reactor systems for efficient high temperature power generation. However, such development has encountered several difficulties. For example, there is a need for elaborate containment provisions in liquid cooled reactors to protect against the explosive release of hot liquid coolants. Also, very heavy reactor vessels are required with water-moderated reactors. Where such reactors are attempted to be operated at high temperatures severe complications are due to phenomena associated with change of phase (water to steam) within the reactor and also to problems associated with superheating in water reactors and reheating in all reactors. Where attempts have been made to use exotic coolants such as sodium and helium, and/or organic moderators, the difficulties have multiplied. Also, in such reactor systems heat exchangers have been needed between the reactor and the turbine, either to transfer heat from the coolant to a suitable working medium for the turbine, or to exclude radioactive materials from the turbine.

Accordingly, it is an object of this invention to provide an improved nuclear reactor system for efficient high temperature power generation.

Another object of the invention is to provide an improved nuclear reactor system which produces superheated steam and uses that steam directly in an electrical power generating system.

A more specific object of this invention is to provide an improved form of gas-cooled solid moderator nuclear reactor.

Another object of the invention is to provide a novel form of removable coolant tube-fuel element subassembly for use in gas-cooled, solid moderator nuclear reactors.

Another object of the invention is to provide a novel form of a replaceable nuclear reactor subassembly incorporating a fuel element, a coolant passage, solid moderator material separating the fuel element and coolant passage, a chamber for radioactive products and coolant leak detection all housed in an enclosing jacket.

Still another object of the invention is to provide an electrical power generating system which incorporates a nuclear reactor heat source in which the reactor coolant is used directly in the power system to provide both superheat and reheat to the driving stages for the associated electrical power generating equipment.

In accordance with principles of the invention there is provided a gas-cooled nuclear reactor which incorporates a multiplicity of removable modular subassemblies, each of which includes fuel element, moderator and coolant flow tube. The coolant tube is designed for minimum content of parasitic (i.e., neutron-absorbing) material commensurate with the normal life of the associated fuel element and is assembled in graphite or another suitable solid moderator structure which also contains the fuel element. Each subassembly is suitably clad and includes a chamber to retain fission products such as radioactive gases with provision for thermal expansion in the subassembly and for detection of any coolant leakage. The reactor design permits easy replacement of any subassembly of coolant flow tube and associated fuel element in a single operation.

In the preferred embodiment of the invention steam is used as the coolant, being introduced in a slightly superheated condition and highly superheated in the reactor as it flows through the coolant tubes of the subassemblies. No coolant phase change occurs in the reactor and the introduced coolant steam is heated to superheat conditions by the reactor. A first portion of the output steam is utilized to directly drive the electrical power generating equipment and the remainder of the coolant steam is circulated through a heat exchanger and a spray-type evaporator circuit. The first portion of the superheated steam from the reactor is applied directly to a high pressure turbine stage and the high pressure turbine exhaust is reheated in the heat exchanger by the other portion of the superheated steam from the reactor. The reheated steam is then applied to a lower pressure turbine stage. Both turbine stages drive suitable electrical generation equipment. Depending upon detail arrangements, the high and lower pressure turbine stages mentioned herein may be combined as different stages of a single turbine, or separated into several turbines, and may drive one or more electrical generators, or other loads. The turbine condensate is preheated in conventional extraction heaters and returned to the spray-type evaporator, through which the second portion of the superheated steam is channelled after leaving the heat exchanger. The still superheated steam in that second portion mixes with and evaporates the condensate into steam. This mixture of the second portion of the steam and the evaporated condensate is then recirculated by the blower through the reactor coolant tubes.

In certain embodiments it is sometimes advantageous to grade the diameter and thickness of the coolant tubes in the reactor fuel element subassemblies to improve the efficiency of heat transfer and thereby minimize the blower power required. The amount of parasitic (i.e., neutron-absorbing) material required for the coolant tube walls can also be minimized by such grading. The replaceability of the assembly of fuel element and coolant tubes also allows the use of coolant tubes with a minimum amount of parasitic material, as the coolant tubes can be designed on a creep basis for the relatively short life of the replaceable fuel element, rather than for the much longer life of the reactor core. Minimizing parasitic material provides fuel economies due to the reduction in required enrichment of fuel.

Electrical power generating systems incorporating reactors constructed in accordance with the principles of the invention are capable of operation at efficiencies above 40%.

Other objects, features and advantages of the invention will be understood as the following description of preferred embodiments thereof progresses, in conjunction with the drawings, in which:

FIG. 1 is a perspective view of a nuclear reactor and associated electrical power generation system constructed in accordance with the principles of the invention, showing a portion of the reactor core in section;

FIG. 1a is an enlarged perspective view of a cluster of the fuel element-coolant tube assemblies and associated valving;

FIG. 2 is a perspective view of a portion of a first embodiment of a coolant tube and fuel element assembly utilized in the reactor shown in FIG. 1;

FIG. 3 is a perspective view of the steam coolant control valving associated with the coolant tube assemblies in the reactor shown in FIG. 1;

FIG. 4 is a sectional view of a second embodiment of a coolant tube-fuel element assembly in which the coolant tubes have graded hydraulic diameters as a function of heat transfer characteristics of the coolant.

FIG. 5 is a sectional view of the coolant tube-fuel element assembly taken along the line 5—5 of FIG. 4;

FIG. 6 is a graph indicating pumping power characteristics as a function of temperature of certain gas coolants suitable for use in nuclear reactors; and FIG. 7 is a schematic diagram of the electrical power generation system associated with the reactor shown in FIG. 1 illustrating the coolant flow paths employed in that system.

In FIG. 1 there is shown a nuclear reactor having a core 10 of graphite which has a multiplicity of axially extending passageways 12 therethrough in which are received fuel element and coolant tube assemblies 14. A plurality of axially movable control rods 16 (one of which is illustratively shown in FIG. 1a) of high neutron absorbing material are also associated with the core and control the level of neutron flux in the conventional manner. The core rests on a support of refractory insulating material 20 and the entire structure is mounted within a concrete vault 22 which has passageways therethrough for the fuel element-coolant tube assemblies 14 so that connections may be made to the top annular header 24 and the bottom annular header 26. In the single pass system shown in FIG. 1 gaseous coolant (steam) is pumped by blower 30 through the lower header 26 and the coolant tubes in the assemblies 14 to the upper header 24 from which a first portion is distributed to the high pressure turbine 32 and a second portion is applied through a reheat heat exchanger 34 to a spray-type evaporator 36. The exhaust coolant from the high pressure turbine is passed through the heat exchanger 34 and applied serially to a reheat turbine stage 38 and a low pressure turbine stage 40 to drive the generator 42. The coolant exhausted from the turbine is condensed in conventional manner, and the condensate is heated in extraction heaters and applied to the sprays of the spray-type evaporator 36 for conversion into steam. In that operation the converted steam is combined with the second portion of coolant and is then pumped by the blower 30 back through the reactor to repeat the cycle.

Also shown in FIG. 1 are the fuel element-coolant tube assembly connections, controls and handling equipment and a single cluster of four assemblies is shown in greater detail in FIG. 1a. The lower ends of the coolant tubes in each assembly 14 are directly connected to the lower header 26 but the upper ends are joined in a cluster with the coolant tubes in three other assemblies to a common conduit 44, in which steam flow is controlled by a temperature responsive valve 46, and which in turn is connected to the upper header 24. The floor 48 directly above the reactor is formed of removable sections 50 and a shielded fuel element-coolant tube assembly removing chamber 52 is movably mounted in the structure 54 above the reactor. In the operation of removing a cluster of assemblies 14 this chamber is positioned over the assemblies to be replaced, coolant flow in these assemblies is cut off and the associated handling equipment in the chamber 52 removes the exhausted assemblies and replaces them with a fresh unit. Fuel element-coolant tube assembly handling equipment is housed at the far end of the structure 54. These assembly replacement facilities are similar to those for other graphite-moderated reactors, and therefore are not detailed. The several connectors are shown in the drawing in diagrammatic form and it will be understood that additional valving and more complex connectors would be required if an assembly cluster was to be removed while the reactor was under power.

A perspective view of a portion of the fuel element-coolant tube assembly for a single pass design is shown in FIG. 2. Each assembly is positioned in a cylindrical passageway 12 in the graphite core structure 10. As indicated in FIG. 2 there is a gap 56 between the outer jacket 58 of the assembly and the cylindrical surface 60 of passageway 12 which is provided to allow for the thermal expansion of the assembly which occurs for operation at the design temperatures. Each fuel element-coolant tube assembly includes a stainless steel jacket 58 which surrounds a cylinder 62 of a solid moderator such as graphite. Concentrically located within the tube is a fuel element 64 which may be $UO_2$ graphite dispersion fuel with a reflector plug 66 of graphite disposed above the fuel element. Coolant tubes 68 extend axially of the assembly through the graphite cylinder 62 between the fuel element 64 and the jacket 58. Only the upper end of the assembly is shown in FIG. 2, there being a similar configuration at the lower end. The tubes 68 are all secured in a manifold header plate 70 through which they pass and are fastened therein in fluid tight relation for communication with the exit conduit 72. The manifold plate 70 is spaced from the reflector plug 66 and an internal chamber area 74 is thus formed within the jacket 58 above the graphite reflector plug 66. Radioactive gases generated during the fission process are contained within the chamber 74. Centrally disposed in the header plate 70 is a leak monitoring tube 76 which extends through the plate 70 and communicates with the chamber 74. The leak monitoring tube 76 is also connected to a pressure sensitive device. Should a leak develop in any of the coolant tubes 68, the released high pressure coolant will cause the pressure in the enclosed chamber area 74 to rapidly increase and this increase in pressure will be immediately evidenced on the pressure sensitive device connected to the tube 76. An expansion joint arrangement generally indicated at 78 is provided to accommodate thermal expansion over the temperature range from the cold temperature to the normal jacket operating temperature of approximately 1000° F.

As shown in FIG. 3 each set of four fuel element-coolant tube assemblies are joined together in a cluster through suitable connectors and valving 80 to a common conduit 44 and through a temperature responsive valve 46 to the header 24. This temperature responsive valve arrangement controls the flow of coolant steam through the multiple paths within the reactor core so that a desired outlet temperature of superheated steam may be maintained notwithstanding power shifts within the reactor.

A second embodiment of the form of the fuel element-coolant tube assembly of the invention is indicated in FIGS. 4 and 5. It illustrates two variations, a two-pass arrangement and a graded coolant tube arrangement, either or both of which might be advantageous in particular cases. This coolant tube assembly arrangement is particularly advantageous for use in steam-cooled reactor systems as it enables adjustment of the required pumping power as a function of the temperature characteristics of the steam as it is heated during its passage through the coolant tube assemblies. As indicated in the graph in FIG. 6, steam has a rising pumping power requirement as a function of temperature in contrast with other gaseous coolants such as air, carbon dioxide, helium and hydrogen, the pumping power characteristics of which decrease or remain substantially constant over the temperature range of interest. Due to this characteristic of steam, it is advantageous to grade the hydraulic diameters of the coolant tubes to provide more uniform heat transfer throughout the length of the coolant tube and thereby minimize the blower power required. In the coolant tube assembly illustrated in FIGS. 4 and 5, the coolant enters the tube path, flows in one direction past the heat source, and then is reversed to flow in the opposite direction past the same heat source. The diameters of the coolant tubes are also graded so that more efficient heat transfer operations are possible. In the case of steam, the hydraulic diameter of the coolant tube is gradually increased so that less pumping power is required to move a quantity of coolant as its temperature increases. In the embodiment shown in FIGS. 4 and 5, there is provided two sets of fuel element-coolant tube assemblies 90, one in the lower half of the reactor core and the other in the upper half of the reactor core. The reactor core 10 rests on a similar support framework 20 as in the case of the reactor illustrated in FIG. 1. Fuel element-coolant tube assemblies may be inserted from either end of the reactor core and are positioned by means of a graphite spacer 92 centrally located in the core. In each assembly, each coolant tube includes an inlet portion 94 of comparatively small hydraulic diameter, an intermediate or transition portion 96 of increasing hydraulic diameter and an outlet portion 98 of a still larger hydraulic diameter. This grading of the effective hydraulic diameters is made a function of the temperature of the coolant, which is lowest in the inlet portion of the assembly, higher in the intermediate portion, and highest in the outlet portion of the assembly. The grading can also be accomplished by joining tubes of the desired diameters and wall thicknesses, rather than by forming a single tube as indicated in FIG. 4.

As in the case of the single pass coolant tube configuration shown in FIGS. 1 and 2, there is a similar manifolding of the inlet portions and the outlet portions so as to provide a single conduit 100 for inlet and a corresponding single conduit 102 for coolant outlet. The assembly also includes a chamber for containing radioactive gas and similar pressure responsive provision 104 for leak monitoring. The jacketing is also of stainless steel or other suitable material selected to meet the temperature requirement while minimizing the use of parasitic neutron-absorbing materials which reduce the neutron economy of the reactor operation. In either form of assembly the coolant tubes are designed with a wall thickness sufficient to have a creep life equal to the projected life of the fuel element at the temperatures and pressures at which the reactor is to be operated. In this manner, the thickness of stainless steel utilized in the coolant tube assembly both for the coolant tubes and for the jacketing need only be dimensioned to withstand the temperature stresses and the creep conditions for a life of the fuel element only rather than for the projected life of the reactor itself. In the event of coolant tube failure, the system enables easy detection and isolation of the defective coolant tube assembly and after the defective assembly has been isolated, it may be disconnected from the system and removed as feasible. This is particularly desirable in the case of a power system requiring a high level power output at a continuously sustained uniform level. As the radioactive gases are contained within the jacket of the fuel element-coolant tube assembly the defective unit to be replaced is disconnected from the coolant header by control of the valving system and the connections are mechanically broken at each end so that the elongated assembly may be slid out of the core and another assembly placed therein.

It will be noted that the coolant is jacketed and physically isolated from the fuel element both by the stainless steel tube wall and by the solid moderator. In assembly, discs of the moderator material may be slid over the coolant tubes in stacked relation, the fuel element inserted in the center and the several elements then sealed within the jacket by welding the manifold headers to the jacket. Of course, it will be understood that other arrangements of coolant tube and fuel elements may be employed. For example, the fuel element may be annular in configuration and one or more coolant tubes placed inside the fuel element.

In the power system diagrammatically illustrated in FIG. 7, the reactor 10 is supplied with steam over line 130 from the blower 30 at 1450 p.s.i.a., and enthalpy of 1195 B.t.u./lb. The output of the reactor on line 132 is superheated steam at 1400 p.s.i.a. and 1050° F. In the two pass system the steam may be allowed to gain 200 B.t.u./lb. in the first pass and the remainder in the second pass with a coolant inlet temperature of 608° F. For a total pressure drop of 60 p.s.i., a drop of 20 p.s.i. in the first pass and a drop of 40 p.s.i. in the second pass is a desirable ratio. Approximately 70% of the output steam is recirculated through line 134, the reheater 34, the evaporator 36, the blower 30, and back to the reactor 10 via line 130. The remaining fraction of the output steam is applied over line 136 to the high pressure turbine 32. The high pressure turbine 32, the reheat turbine 38 and the low pressure turbine 40 are all connected to drive the shaft of the generator 42 which in the illustrated system has a rated power output of 302,000 kilowatts net. The steam applied to the high pressure turbine leaves at 350 p.s.i.a. pressure and most of it (about 80%) is applied over line 138 to the reheater 34 in which its temperature is increased to 1000° F. for application to the reheat turbine. Approximately 10% of this exhaust steam is bled off onto line 140 to the turbine 142 which drives the blower 30 to circulate the coolant steam to the reactor 10. In other embodiments of this system, the blower 30 could be driven by an electric motor. The remaining fraction of the exhaust steam from the high pressure turbine is transferred over line 144 to the extraction heater 146 and associated conventional feedwater processing equipment generally indicated in the lower right portion of FIG. 7. Extraction steam from the reheat and low pressure turbines is also applied to the feedwater heaters. The low pressure turbine exhausts into the condenser 150 which also receives exhaust steam from the blower drive turbine 142. The condensate is pumped through the feedwater heating system to the sprays of the evaporator 36 where it is evaporated by, and mixed with, the steam which has been channeled through line 134. The mixture then passes at a pressure of approximately 1315 p.s.i.a. and a temperature of 600° F. over conduit 160 to the input of the blower 154 for recycling through the reactor 10.

The cycle efficiency of this system is over 40% and at this efficiency it is economically competitive with conventional fossil fuel plants. A sufficient quantity of steam is circulated through the reactor to drive the several turbine stages for electrical power generation and also to evaporate the feedwater. The steam-driven blower provided in the coolant circuit offsets the pressure drop in the reactor and in the circulating system and maintains the required magnitude of coolant flow. As the recirculated coolant must provide the heat of vaporization to the feedwater, the flow rate for this function in this embodiment is sufficient to reheat the exhaust of the high pressure turbine to within 50° F. of the initial steam temperature.

In both the single pass design shown in FIGS. 1–3 and the double pass design shown in FIGS. 4–5 the coolant flow may be controlled by the temperature responsive valve 46 as necessary to best accommodate reactor power distribution shifts produced as a result of the spending of the nuclear fuel. The design provides a novel fuel element-coolant tube assembly which enables isolation and identification of coolant system failures within the reactor core and does not necessitate provision of large heavy pressure vessel construction. The coolant tube assemblies are operated in a high temperature-high pressure system in which the effects of metal creep are significant and the tubes must include sufficient metal to withstand those stresses unless they may be periodically replaced with comparative ease. By utilizing this selectively replaceable coolant tube configuration, it is possible to minimize the stainless steel (parasitic) content of the coolant system and thereby reduce the amount of enrichment necessary for the uranium fuel. In addition the arrangement enables the reversal of the direction of coolant flow so that coolant characteristics may be adjusted in accordance with axial shifts in power distribution within the reactor.

In the design of the two pass system, the design also includes consideration of equivalent metal temperatures in each pass to minimize differential thermal expansion problems. Due to the length of fuel channels required for high thermal energy graphite-moderated reactors, the two pass system incorporating coolant tube assemblies of the type shown in FIGS. 4 and 5 has several advantages, including the facilitation of the handling of the assemblies due to the shorter length of the removable units; and additional flexibility so that there may be better accommodation of shifts in the axial power distribution is obtainable.

In the preferred embodiment the core dimensions are 30 feet in diameter by 20 feet in height with the spacing of the coolant tube-fuel element assemblies on 8 inch by 8 inch centers with 1590 coolant tube assemblies in the core. The following is a tabulation of the design characteristics of the power system:

| | |
|---|---|
| Power plant rating, kwe. gross/net | 314,000/302,000. |
| Reactor thermal rating, kwt. | 766,000. |
| Heat rate, B.t.u./kwh. | 8,330. |
| Plant thermal efficiency, percent | 41. |
| Initial pressure, p.s.i.a. | 1,400. |
| Initial steam temperature, °F. | 1,050. |
| Reheat steam temperature, °F. | 1,000. |
| Steam flow to turbine | 2,170,000 lbs./hr. |
| Steam flow, reheat | 1,773,500 lbs./hr. |
| Reactor flow rate | 8,070,000 lbs./hr. |
| Reheat pressure | 350 p.s.i.a. |
| Condenser vacuum | 1½″ Hg A. |
| Type of fuel | $UO_2$-dispersion in graphite. |
| Type of clad | Stainless steel (304)–010″. |
| Fuel loading, kg. of U | 200,000. |
| Fuel inventory, ratio | 1.44. |
| Plant capability | 80%. |
| Conversion ratio, gms. Pu/Kg-U | 8.3 gms. Pu/Kg-U. |
| Initial enrichment, w/o | 2.14. |
| Discharge enrichment, w/o | .86. |
| Ave. fuel exposure, mwd./mt. of U | 15,000. |
| Peak-to-average flux | 3.0/1. |

The system has a high cycle efficiency which may be increased with pressure increases up to the supercritical range. Reheat in the system is in the range of 1050 to 1000° F. As there is no change in the phase of the coolant within the reactor, its design in general respects is simplified.

Thus it will be seen that the invention provides an improved reactor system particularly adapted for use in conjunction with electric power generating systems. The reactor may be a fast, intermediate or thermal reactor in which the load shift as a function of fuel life can be controlled easily by the selective channeling of steam coolant through the multiplicity of coolant passages. The reactor fuel arrangement enables selective removal of coolant tubes as a function of fuel life, thus enabling a minimal use of parasitic materials in the reactor core. Each fuel element-coolant tube assembly may be removed as a unit in which the fission gases are totally enclosed in a chamber of substantial size thus facilitating handling of the fuel element assemblies. In addition, the system is exclusively gas-cooled and containment problems which exist with liquid coolants are avoided.

While preferred embodiments of the invention have been shown and described, various modifications therein will be obvious to those skilled in the art and therefore it is not intended that the invention be limited to the disclosed embodiments or to details thereof and departures may be made therefrom within the spirit and scope of the invention as defined in the claims.

We claim:
1. A steam-cooled nuclear reactor comprising a nuclear reactor core,
   a housing surrounding and supporting said core,
   a multiplicity of generally parallel channels extending through said core,
   a fuel element assembly in said channel including a fuel element and moderator material surrounding said fuel element, and
   a multiplicity of coolant passageways extending through said core sealed from said fuel elements, each said coolant passage having an effective flow area that gradually increases from inlet to outlet as a function of the pumping power required for circulating steam through said coolant passages, and means for circulating steam through said coolant passages without change of phase.

2. A removable nuclear fuel element-coolant passage assembly for positioning in the core of a gas-cooled nuclear reactor comprising a fuel element,
   solid moderator material surrounding said fuel element,
   a jacket enclosing and sealing said fuel element and said solid moderator material within said jacket, and
   a coolant passage sealed from said fuel element and extending through said jacket, said coolant passage having an inlet and an outlet and an effective flow area that increases between said inlet and said outlet, and
   connection means external of said jacket for connecting said passage to a coolant circuit so that gaseous coolant may be introduced into said passage for flow through said assembly in a cooling operation.

3. The assembly as claimed in claim 2 and further including a chamber in said jacket for storing radioactive products generated during the operation of said reactor, and coolant leak monitoring means communicating with said radioactive product chamber.

4. A gas-cooled nuclear reactor comprising a nuclear reactor core,
   a housing surrounding and supporting said core,
   a multiplicity of generally parallel channels extending through said core,
   a fuel element assembly unit in each channel, each said assembly unit comprising a fuel element,
   solid moderator material surrounding said fuel element,
   a tubular jacket enclosing and sealing said fuel element and said solid moderator material within said jacket,
   a coolant passage sealed from said fuel element and extending through said jacket, said coolant passage having an inlet and an outlet and an effective flow area that increases between said inlet and said outlet,
   coolant conduit means common to said assembly units to provide a closed coolant recirculation circuit for flowing gaseous coolant through said conduit means and said coolant passages for return to said conduit means to remove heat from said fuel element assemblies, and
   coupling valve means external of said jacket for connecting the inlets and outlets of said coolant passages to said conduit means so that gaseous coolant may be introduced into said passages for flow through said assembly units in a cooling operation.

5. The nuclear reactor as claimed in claim 4 wherein each of said fuel element assemblies include a chamber for storing radioactive products generated during the operation of said reactor, and coolant leak monitoring means communicating with said radioactive product chamber.

6. The nuclear reactor as claimed in claim 4 wherein the coolant passage of said fuel assembly unit is U-shaped and provides a continuous coolant flow path including a first portion in which coolant flows in one direction past said fuel element and a second portion parallel to said first portion in which the coolant flows in the opposite direction past said fuel element, the effective flow area of said second portion being greater than the effective flow area of said first portion, and further including assembly unit locating means positioning centrally in said reactor core for dividing each said channel into two sections with an assembly unit located in each section of such channels so that two assembly units may be placed in each channel one from one end of said core and another from the opposite end of said core.

7. A steam-cooled nuclear reactor system comprising a nuclear reactor core,
   a housing surrounding and supporting said core,
   a multiplicity of generally parallel channels extending through said core,
   a removable fuel element assembly unit in each channel, each said assembly unit comprising a fuel element,
   solid moderator material surrounding said fuel element,
   a tubular jacket enclosing and sealing said fuel element and said solid moderator material within said jacket, and
   a plurality of coolant passages sealed from said fuel element and extending through said jacket, each said coolant passage having an inlet and an outlet and an effective flow area that increases between said inlet and said outlet,
   coolant conduit means common to said assembly units and directly connected to turbine means and blower means for electric power generation, said conduit means providing a recirculation circuit for flowing steam through said conduit means and said coolant passages for return to said conduit means to remove heat from said fuel element assemblies, and
   coupling valve means external of said jacket, for connecting the inlets and outlets of said coolant passages to said conduit means so that steam may be introduced into said passages from said blower means for flow through said assembly units in a cooling operation and then applied to said turbine means without change in phase of said steam.

References Cited by the Examiner

UNITED STATES PATENTS

| | | | |
|---|---|---|---|
| 2,777,812 | 1/57 | Powell et al. | 176—19 |
| 2,799,642 | 7/57 | Hurwitz et al. | 176—71 |
| 2,905,611 | 9/59 | Tonks | 176—71 |
| 2,938,845 | 5/60 | Treshow | 176—54 |
| 2,946,732 | 7/60 | Wootton | 176—31 |
| 2,957,815 | 10/60 | Pacault et al. | 60—108 |
| 2,990,352 | 6/61 | Finniston et al. | 176—82 |
| 2,996,444 | 8/61 | Simnad | 176—68 |
| 2,998,367 | 8/61 | Untermyer | 176—56 |
| 3,010,889 | 11/61 | Fortescue et al. | 176—19 |

FOREIGN PATENTS

| | | |
|---|---|---|
| 222,392 | 11/57 | Australia. |
| 835,132 | 5/60 | Great Britain. |
| 838,838 | 6/60 | Great Britain. |
| 855,391 | 11/60 | Great Britain. |

CARL D. QUARFORTH, *Primary Examiner.*
REUBEN EPSTEIN, *Examiner.*